United States Patent [19]

Willkens

[11] Patent Number: 5,510,304
[45] Date of Patent: Apr. 23, 1996

[54] COARSE REACTION BONDED SILICON NITRIDE

[75] Inventor: Craig A. Willkens, Sterling, Mass.

[73] Assignee: Saint-Gobain/Norton Industrial Ceramic Corporation, Worcester, Mass.

[21] Appl. No.: 305,640

[22] Filed: Sep. 14, 1994

Related U.S. Application Data

[63] Continuation-in-part of Ser. No. 123,617, Sep. 17, 1993, abandoned.

[51] Int. Cl.$^6$ .................................................. C04B 35/59
[52] U.S. Cl. ................................................ 501/96; 501/97
[58] Field of Search .................................... 501/96, 97

[56] References Cited

U.S. PATENT DOCUMENTS

| | | | |
|---|---|---|---|
| 3,356,513 | 12/1967 | Washburn | 501/97 |
| 3,639,101 | 2/1972 | Washburn | 501/97 X |
| 4,331,771 | 5/1982 | Washburn | 501/97 |
| 4,687,655 | 8/1987 | Hunold et al. | 501/97 X |
| 4,987,104 | 1/1991 | Trigg | 501/97 X |
| 5,026,671 | 6/1991 | Hanzawa et al. | 501/96 |
| 5,049,530 | 9/1991 | Huckabee et al. | 501/97 |

OTHER PUBLICATIONS

Brian James Dalgleish, "The Influence of Fabrication on the Microstructure and Strength of Reaction–Bonded Silicon Nitride", Jul. 1974, Metallurgy and Materials Science Department, Royal School of Mines, London, pp. 1–200.

P. Longland, "Reaction Bonded Silicon Nitride: Relationship Between Developing Microstructure and Young's Modulus During Reaction Bonding", Submitted in fulfilment of the requirements for the Degree of Doctor of Philosophy, Department of Ceramics, Houldsworth School of Applied Science, University of Leeds, May 1978, pp. 1–166.

B. J. Dalgheish and P. L. Pratt, "The Influence of Microstructure on the Strength of Reaction–Bonded Silicon Nitride", Proc. Brit. Ceram. Soc., 25, (1975) pp. 295–311, no month.

A. Atkinson, A. J. Moulson, and E. W. Roberts, "Nitridation of High–Purity Silicon", Journal of the American Ceramic Society, vol. 59, No. 7–8, pp. 285–289, Jul.–Aug. 1976.

A. J. Moulson, "Review Reaction–bonded silicon nitride: its formation and properties", Journal of Materials Science 14 (1979) pp. 1017–1051, no month.

P. Popper and S. N. Ruddlesden, "The Preparation, Properties and Structure of Silicon Nitride", Proc. Brit. Ceram. Soc., 9, (1961) pp. 603–627, no month.

D. J. Godfrey and M. W. Lindley, "The Strength of Reaction–Bonded Silicon Nitride Ceramics", Proc. Brit. Ceram. Soc., 22, (1973) pp. 229–252, no month.

A. Atkinson, P. J. Leatt and A. J. Moulson, "The Role of Nitrogen Flow into Nitriding Compact in the Production of Reaction–Sintered Silicon Nitride", Proc. Brit. Ceram. Soc., 22, (1973) pp. 253–274, no month.

B. J. Dalgleish and P. L. Pratt, "The Microstructure of Reaction–Bonded Silicon Nitride", Proc. Brit. Ceram. Soc., 22 (1973) pp. 326–336, no month.

(List continued on next page.)

*Primary Examiner*—Karl Group
*Attorney, Agent, or Firm*—Thomas M. DiMauro

[57] ABSTRACT

A ceramic comprising:

a) between 20 w/o and 90 w/o unnecked composite grains comprising:

i) between 5 w/o and 100 w/o silicon nitride, and ii) between 0 w/o and 95 w/o free silicon, said composite grains having lengths of at least 50 microns and widths of at least 10 microns, and b) between 10 w/o and 80 w/o matrix grains having lengths of less than 20 microns.

21 Claims, 3 Drawing Sheets

OTHER PUBLICATIONS

R. N. Katz and A. F. McLean, "Reaction–Bonded Silicon Nitride as a Small Gas–Turbine Nozzle Material", Proc. Brit. Ceram. Soc., 22, (1973) pp. 409–427.

B. F. Jones and M. W. Lindley, "Strength, Density, and Nitrogen Weight Gain Relationships for Reaction Sintered Silicon Nitride Prepared from Fine Silicon Powders", Powder Metallurgy International, vol. 8, No. 1, 1976, pp. 32–34, no month.

20μm

100μm

20 MICRONS

500um

100um 5,510,304

COARSE REACTION BONDED SILICON NITRIDE

This is a continuation-in-part of application U.S. Ser. No. 08/123,617 filed on Sep. 17, 1994, now abandoned.

BACKGROUND OF THE INVENTION

Reaction bonded silicon nitride ("RBSN") -based ceramic materials are currently viewed as useful materials for high temperature applications due to their superior thermal and mechanical properties. For example, containers used in the production of silicon billets are typically made from fused silica. However, upon cooling, the fused silica often devitrifies and forms pockets of cristobalite. The cooling of cristobalite, in turn, induces a volume expansion which causes the container to crack. Ceramics less susceptible to thermal expansion have been studied as potential replacement materials for silica in these containers. One ceramic, silicon nitride, has been targeted as one particularly suitable replacement material. RBSN also possesses chemical compatability in applications that would react with carbides and oxides, a favorably low thermal expansion coefficient, a high surface tension, and so is suitable for applications involving silicon handling and other refractory applications.

In many applications, silicon nitride ceramics are produced by the reaction bonded method. This method entails forming a green body from a fine (i.e., less than 20 micron) silicon powder and exposing the body to a nitrogen atmosphere at a maximum temperature of about 1450° C., thereby nitriding the elemental silicon into reaction bonded silicon nitride ("RBSN"). See, e.g., U.S. Pat. No. 4,521,358. This approach typically produces a near net shape ceramic useful in refractory applications.

However, the art has typically experienced problems in developing RBSN technology. For example, because fine silicon powders tend to be very expensive, the cost of producing an RBSN is relatively high. In addition, when fine silicon powders are produced by milling coarse silicon powders, the milling often introduces contamination into the powders, thereby rendering the fine silicon powder less pure. Moreover, the typical silicon powder green body produced by conventional methods possesses low green strength, thereby making large shape fabrication difficult. As a result, handling these low strength green bodies is often problematic. Lastly, there are many ceramic applications which would benefit from utilizing a ceramic having free silicon embedded therein. However, conventional RBSN technology does not teach how to make RBSN's having free silicon embedded therein which is shielded from environmental attack, and in particular, an RBSN having free silicon embedded therein usable above the melting point of silicon (1410° C.).

RBSN processing has also encountered difficulties. The nitriding reaction discussed above is an exothermic reaction producing about 733 KJ/mol of heat. If the rate of nitridation is uncontrolled, then the temperature increase resulting from this reaction is typically significant enough to at least partially melt the elemental silicon, thereby causing meltout. Three process modifications to mitigate the exotherm problem have been suggested. One modification limits the rate at which nitrogen gas is introduced into the furnace, thereby reducing the amount of nitrogen available for reaction. Another modification adds an inert gas such as argon or helium into the nitrogen stream, thereby diluting the nitrogen atmosphere. A third modification adds a nonreactive material such as silicon nitride, silicon carbide or boron nitride to the green body. This approach not only reduces the reaction rate, it also provides a thermal sink. Although each of these suggested means for controlling the exothermic reaction has advantages, each also has its drawbacks. In particular, each requires strict control over the reaction, thereby raising the cost of RBSN production and narrowing its applicability. For example, adding a non-reactive filler material to the green body decreases the extent of reaction and thus the final density, and also significantly increases the raw material cost. In addition, the use of silicon carbide as a filler may unacceptably raise the thermal expansion coefficient of the RBSN. The use of a silicon nitride seed typically consists of a high surface area particle which has high reactivity.

Thus, it is an object of the present invention to provide a silicon nitride ceramic which is inexpensive, preferably has high purity, more preferably can be formed into large shapes, and most preferably contains embedded free silicon which is shielded from environmental attack and is functional above the melting point of silicon. It is a further object of the present invention to provide a method of making reaction bonded silicon nitride without requiring strict process control in the nitridation reaction.

SUMMARY OF THE PRESENT INVENTION

In accordance with the present invention, there is provided a reaction bonded silicon nitride ceramic (RBSN) comprising:

a) coarse composite grains comprised of between about 1 w/o and about 100 w/o silicon nitride and up to about 99 w/o free silicon, and b) fine matrix grains.

In preferred embodiments of the present invention, the composite grains are comprised of a dense beta silicon nitride shell and a free silicon core.

DETAILED DESCRIPTION OF THE INVENTION

Figure 1:
FIGS. 1, 3, 4, and 5 are photographs of silicon nitride ceramics of the present invention, wherein the ceramic contains composite grains having a dark dense beta silicon nitride shell and a light free silicon core.
Figure 3:
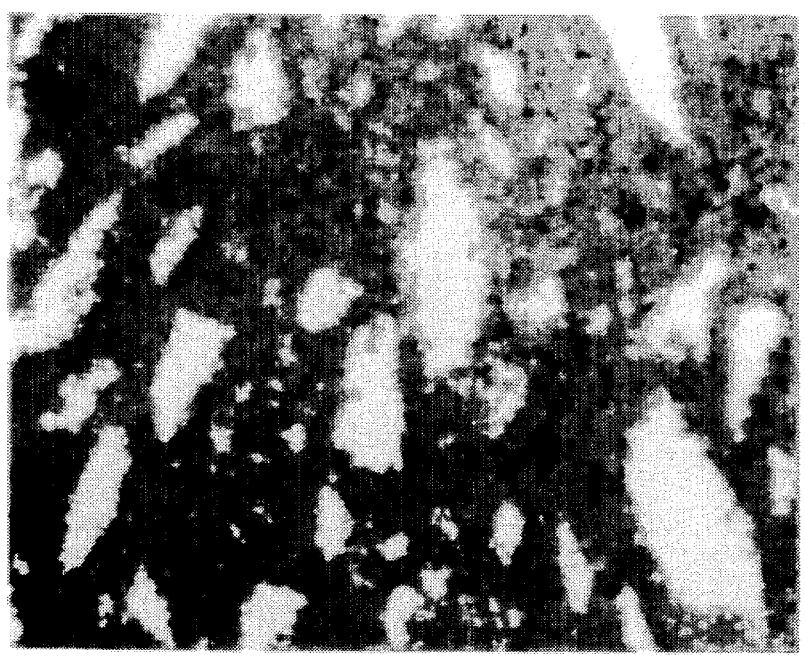
Figure 2:
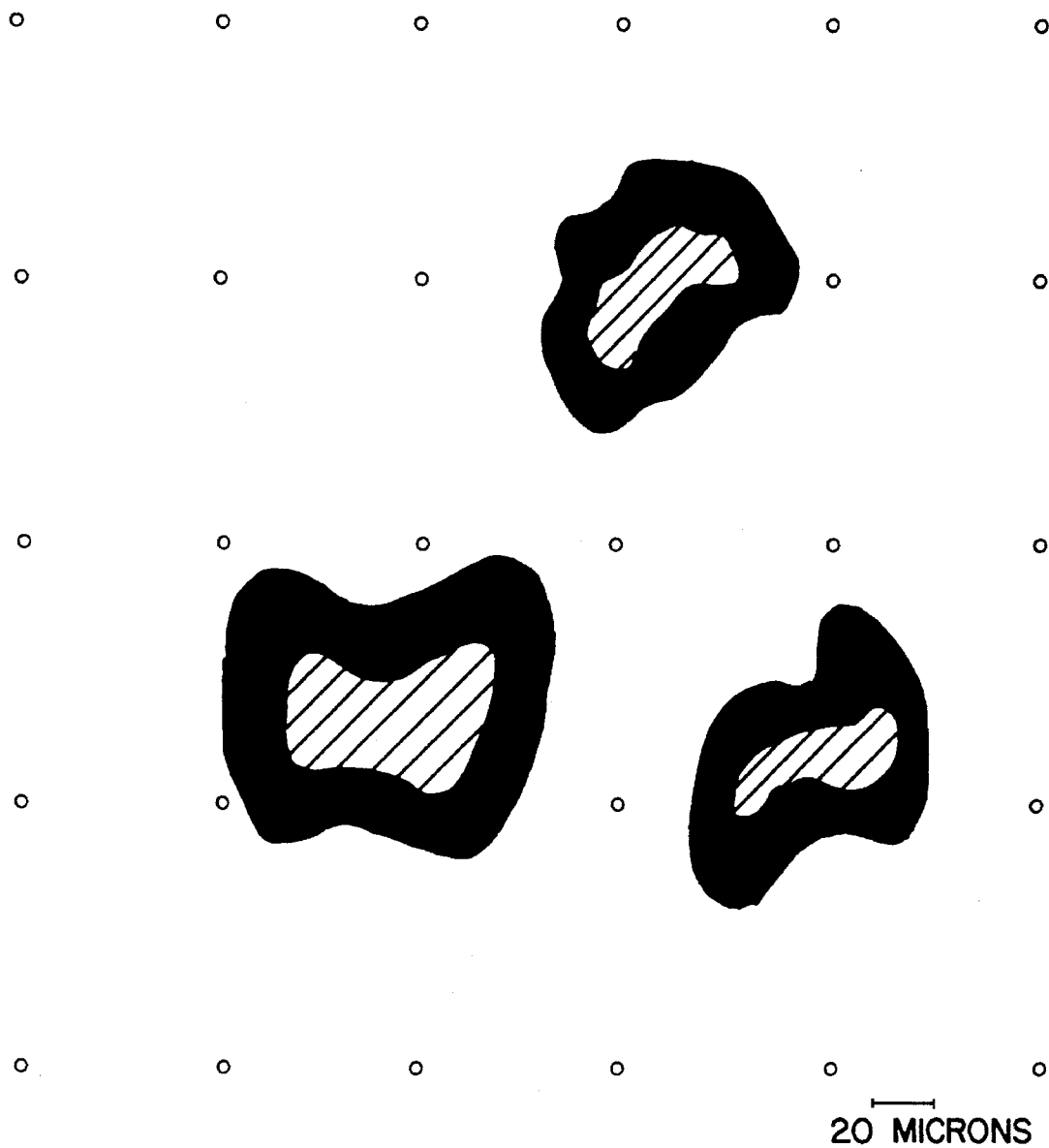
FIG. 2 is a schematic drawing of the RBSN of the present invention, wherein the darkened area is coarse beta silicon nitride, the hatched area is free silicon, and the dotted area is a fine silicon nitride matrix.
Figure 4:
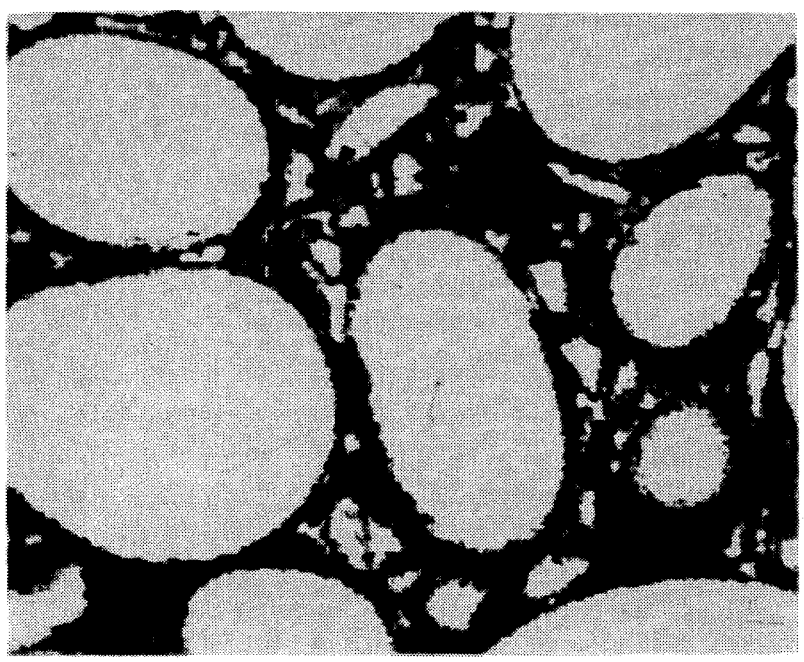

Hereinafter, grains having a length of less than about 20 microns are considered to be "fine" and grains having a length of more than about 50 microns are considered to be "coarse".

It has been found that nitriding a green body comprising both fine and coarse silicon grains provides an RBSN ceramic having lower reactivity, in particular a resistance to oxidation which is superior to conventional fine grained RBSN's. It has further been found that such nitridation can be carried out with only moderate reaction control.

The ceramic bodies of the present invention can be produced by any number of conventional ceramic processing techniques. These techniques include forming a slurry of powders of silicon nitride or a precursor thereof, forming a green body from that slurry, and converting the green body to a dense ceramic. Preferably, however, processing includes forming a slurry comprising fine silicon and coarse silicon grains, forming a green body from that slurry, and nitriding the green body to a silicon nitride ceramic.

In some embodiments, the fine matrix grains are fine silicon nitride grains. Typically, these fine silicon nitride grains are produced by nitriding a green body comprising fine silicon grains. When introduced into an atmosphere having 1 atm of nitrogen and a temperature of about 1400° C., fine silicon grains react with nitrogen to form fine silicon nitride. It appears that these fine nitrided grains act as a matrix, or bonding agents, for the coarse nitrided grains. These fine grains typically have a surface area of more than about 2 $m^2$/gram. In preferred embodiments, fine silicon consisting essentially of grains no longer than about 10 microns and having less than about 0.5 w/o iron contamination is used. Preferably, Elkem 0.5% MAX. IRON <10 Micron, manufactured by Elkem Materials of Pittsburgh, Pa., is used as the fine silicon. The matrix grains in the ceramic of the present invention typically possess lengths of less than 20 microns, preferably between about 1 and 20 microns, more preferably between 3 and 20 microns.

Typically, the coarse composite grains of the present invention are formed from nitriding a green body comprising coarse silicon grains. When introduced into an atmosphere having 1 atm of nitrogen and a temperature of about 1400° C., the coarse silicon grains of the present invention react with nitrogen to form silicon nitride. Without wishing to be tied to a theory, it is believed that this reduced reaction rate prevents silicon meltdown yet still allows sufficient and controlled nitridation of the silicon without strict engineering control. These coarse silicon grains have a surface area of less than about 0.5 $m^2$/gram, and so provide fewer available reaction sites per unit weight than fine silicon grains. In preferred embodiments, coarse silicon grains having a grain size of between about 50 and about 300 microns are used. In more preferred embodiments, Globe −70 mesh or Globe −120 mesh silicon grains, manufactured by Globe Metallurgical of Cleveland, Ohio, is used as the coarse silicon grains. The average grain size of these two preferred powders are 100 and 50 microns, respectively.

The composite grain in the ceramic of the present invention is unnecked, i.e, it is the product of the reaction bonding of a silicon grain having a length of at least 50 microns, not the product of smaller silicon grains which sometimes link through necking during the reaction bonding process. A good example of such necking is found in FIG. 22b on page 1042 of Moulson, J. Mat. Sci. 14 (1979) 1017–1051. The composite grain is further characterized by its having a length of at least 50 microns, preferably at least 75 microns, more preferably at least 100 microns; a width of at least 10 microns, preferably at least 20 microns; and an aspect ratio typically of between about 1:1 and 3:1, preferably between 1:1 and 2:1.

In some ceramic embodiments of the present invention, essentially all of the composite grains have lengths between 50 and 3000 microns, preferably between 50 and 200 microns, and more preferably between 75 and 125 microns.

In a first embodiment of the present invention, there is provided a green body wherein fine silicon comprises between about 10 weight percent ("w/o") and about 70 w/o of the green body and coarse silicon comprises between about 30 w/o and 90 w/o of the green body. Preferably, the fine silicon comprises about 45 w/o and the coarse silicon comprises about 55 w/o. When this green body is introduced into a nitrogen atmosphere, the silicon reacts with nitrogen to produce silicon nitride. Further, it has been observed that nitridation of the coarse silicon grains typically produces dense beta-silicon nitride, which is easily recognized by x-ray diffraction or by reflected light microscopy of polished sections since it is denser than the surrounding matrix and much darker than unreacted silicon.

In some embodiments of the present invention, the nitridation reaction does not completely nitride the coarse silicon grains in the green body. This incomplete reaction is typically brought about by using either a shorter nitridation cycle or by using coarse silicon having an average size much greater than about 80 microns. Accordingly, the coarse composite grains of the present invention often comprise a dense beta silicon nitride shell and an unreacted, or free, silicon core. See FIGS. 1–4. This composite structure allows the present invention to be used at temperatures above the melting point of silicon, since the silicon contained by the dense beta silicon nitride shell can not leak from the ceramic body. However, the dense beta silicon nitride shell must first be developed by nitridation prior to exceeding the melting point of silicon.

Figure 5:
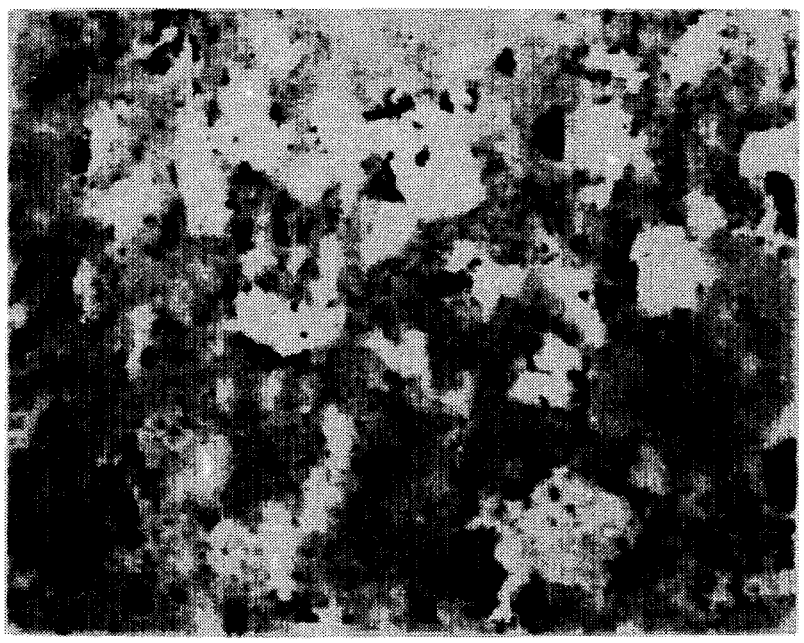

Although the coarse composite grains of the present invention typically comprise silicon nitride and some free silicon (often in the form of a dense beta silicon nitride shell and a free silicon core) it is also contemplated that these grains may be useful when consisting essentially of only dense beta silicon nitride. Accordingly, the coarse composite grain component of the present invention may consist essentially of silicon nitride. See FIG. 5. However, in some embodiments of the present invention, the dense beta silicon nitride shell comprises between 60 w/o and 99 w/o of the composite grain, and preferably between 80 w/o and 99 w/o of the composite grain.

Thus, in the first embodiment described above, nitridation of the green body typically results in an RBSN ceramic whose coarse composite grains comprise in an amount of between about 20 w/o and about 90 w/o of the RBSN, preferably between about 30 w/o and about 50 w/o;, the balance being the fine matrix grains. Preferably, the dense beta silicon nitride shell comprises between about 1 w/o and about 100 w/o of the coarse composite grains, preferably between about 5 w/o and about 100 w/o, more preferably between about 20 w/o and about 100 w/o, with the balance being the free silicon core. The fine matrix grains of this first embodiment typically consist essentially of silicon nitride.

It is contemplated that other materials which are less reactive towards nitrogen than silicon may also be used in accordance with the present invention. For example, in some embodiments of the present invention, silica or alumina may be used as a precursor to the fine matrix grains.

In a second embodiment of the present invention, there is provided a green body comprising fine silica, coarse silicon and fine silicon. In this embodiment, the green body typically contains between about 0 w/o and about 40 w/o fine silicon, preferably about 30 w/o; between about 0 w/o and about 30 w/o fine silica, preferably about 20 w/o; and between about 20 w/o and about 90 w/o coarse silicon, preferably about 50 w/o.

In the second embodiment described above, nitridation of the green body results in an RBSN ceramic typically comprising between about 20 w/o and about 90 w/o coarse composite grains and between about 10 w/o and about 80 w/o fine matrix grains. Within the fine-grained matrix component of this embodiment, silicon nitride is typically present in an amount of between about 0 w/o and about 30 w/o, preferably between about 10 w/o and about 30 w/o, more preferably between about 10 w/o and about 20 w/o; silicon oxynitride is typically present in an amount of between about 30 w/o and about 65 w/o, preferably between about 40 w/o and about 60 w/o, more preferably between about 40 w/o and about 50 w/o; and cristobalite is typically present in an amount of between about 0 w/o and about 5 w/o, preferably less than 1 w/o. The coarse composite grains of this second embodiment typically possess the compositional characteristics of the coarse composite grains of the first embodiment described above.

In a third embodiment of the present invention, there is provided a green body comprising both fine silica and coarse silicon, but without fine silicon. In this embodiment, the green body typically contains between about 0 w/o and about 30 w/o fine silica, preferably about 30 w/o; and between about 70 w/o and about 100 w/o coarse silicon, preferably about 70 w/o. Nitridation thereof typically yields a ceramic having a composition similar to that described in the second embodiment, but with only a small amount (i.e., about 5 w/o) of fine silicon nitride grains in the fine grained matrix, i.e., the RBSN comprises the above-described coarse composite grains bonded by fine matrix grains comprising at least about 90 w/o silicon oxynitride, with the balance of the fine matrix grains typically being silicon nitride and cristobalite.

In some embodiments of the present invention, the green body comprises non-reactive grains. Thus, merely adding a diluent such as silicon nitride to a green body of the present invention does not place the green body outside the scope of the present invention.

If it is desirable to enhance the density of the ceramic of the present invention, sintering aids typically used in the sintering of silicon nitride may be used. These aids, including yttria, magnesia and alumina, may be added to either the green body before nitridation or the RBSN after nitridation. It is anticipated that the use of sintering aids in accordance with the present invention can result in a fully dense ceramic upon sintering the RBSN via any conventional sintering technique such as pressureless sintering, hot pressing or hot isostatic pressing. It is also anticipated that fluxes such as iron, calcium, and sodium may be added to enhance formation of the beta silicon nitride shell, although the nitriding cycle may then need adjustment.

The green body of the present invention may also comprise any typical green body constituent commonly used in the production of ceramic green bodies, including water, dispersants and binders.

The green body may be formed in any manner suitable for making ceramic green bodies, including slip casting, ramming, injection molding, and cold isostatic pressing. In preferred embodiments, slip casting is used.

When the green body of the present invention contains coarse grains, it may have a high green strength. Typically, the green bend strength of these bodies is between about 50 psi and about 1000 psi. When the strength of the green body is above about 100 psi, handling usually decreases as a concern. Other beneficial green properties of these embodiments include a high solids loadings in slurries that prevent settling of the coarse fraction, low shrinkage upon drying which allows for casting around a removable mandrel or core, and an ability to select a thick cross-section. Cross-sections up to 1 inch thick have been nitrided with uniform nitridation due to a large pore size.

The nitridation of the green body may be performed in any manner typically used in RBSN processing. In preferred embodiments, the green body is reaction sintered in a furnace having an atmosphere of nitrogen at 1 atmosphere. The furnace may contain other gases, such as argon, hydrogen or helium, which do not deleteriously react with the grains. Higher or lower pressures, if desired, may also be used.

Although the temperatures used in the nitridation of the present invention include those normally practiced by the art, i.e., between about 1380° C. and about 1470° C., the present invention may also be practiced at temperatures higher than those suggested by the art. In particular, nitridation of the green body can occur at temperatures up to about 1700° C. The benefit of this expanded temperature range is that a greater amount of the coarse grains can be nitrided in less time.

As stated above, if the temperature is rapidly increased to temperatures above the melting point of silicon, there is a danger of silicon meltout. It has been observed that suitable nitridation can be undertaken without silicon meltout by utilizing a dual soak nitridation cycle. A dense beta silicon nitride shell which prevents silicon meltout at high temperatures can usually be developed by creating an initial partial nitriding soak at a temperature of less than 1400° C. for a time of between about 8 and about 18 hours. Thereafter, a second soak at between about 1440° and about 1450° C. for between about 2 and about 16 hours typically sufficiently develops the nitridation without silicon meltout. It is believed that the rate at which the temperature is raised to the first and second soak temperatures is not critical. However, in practical applications, the temperature of the green body is raised from room temperature to the first soak temperature at a rate of about 100° C. per hour, and thereafter is raised to the second soak temperature at a rate of about 40° C. per hour.

The duration of the nitridation cycle is typically that practiced by the art. In preferred embodiments of the present invention, nitridation takes place for between about 1 and about 7 days, depending on whether the green body is fired in a periodic or continuous furnace. In some embodiments, using fast ramp rates and quick soak times, cycle times of less than 24 hours are realized.

The ceramics produced in accordance with the present invention typically have a density of between about 2.2 and about 2.45 grams/cc, preferably about 2.3 g/cc. The strengths of these ceramics is often about 150 MPa. In addition, because coarse grains are typically less reactive than small grains, the ceramics of the present invention are typically more resistant to attack by acids and oxidation than are conventional fine grain silicon nitrides.

One benefit of using coarse silicon grains to practice the present invention is that these grains are commercially available at low cost in a very pure form. In some embodiments, coarse silicon grains having less than about 1 w/o, and preferably less than about 10 ppm, of impurities such as iron, boron and aluminum are used to make the RBSN ceramic. Such grains may be suitably used in the manufacture of RBSN ceramics such as diffusion components and crucibles for growing semiconductor grade silicon. Accordingly, in some embodiments of the present invention, the RBSN ceramics have an iron contamination of less than about 100 ppm, preferably less than about 1 ppm.

The ceramics produced in accordance with the present invention may be used in any number of applications typically requiring ceramics. These uses include, but are not limited to, a crucible for silicon production and a refractory for handling molten aluminum and a setter plate for firing ceramics. Because the present invention may be used as a crucible for molten metal production, the present invention also includes a process for the processing of silicon or aluminum comprising:

a) processing a molten metal selected from the group consisting of aluminum and silicon in a ceramic crucible comprising:
   i) between 20 w/o and 90 w/o unnecked composite grains comprising:
      1) between 1 w/o and 100 w/o silicon nitride, and
      2) between 0 w/o and 99 w/o free silicon, said composite grains having lengths of at least 50 microns and widths of at least 10 microns, and
   ii) between 10 w/o and 80 w/o matrix grains having lengths of less than 20 microns.

It is also anticipated that the present invention can be used as an abrasive for abrading a substrate. When used as an abrasive, it is typically set in a grinding wheel by a resin bond or glass bond.

In embodiments of the ceramic of the present invention containing a significant amount of the above-mentioned composites comprising free silicon, it has been found that embedding this ceramic in a bed of silicon nitride powder and subjecting it to 800 watts of 2.45 GHz microwave energy for one minute raises its temperature from about room temperature to about 1000° C. Accordingly, these ceramics may be useful in applications requiring a heated substrate, such as catalytic converters used in automobiles and crucibles used in Czochralski crystal growth. The ceramic of the present invention may also be used as a suscepter for induction heating.

It has been found that the RBSN of the present invention can be produced in thicknesses of ¼ inch, ½ inch, ¾ inch and 1 inch with densities of between about 2.2 and 2.45 g/cc without realizing silicon runout or silicon rich cores.

EXAMPLE I 175 grams of distilled water, 14 grams of Acranol 290 D binder, manufactured by BASF of Charlotte, N.C., and 7 grams of Ester X67-24 dispersant, manufactured by Reilley-Whitman in Conshohocken, Pa., were added to a plastic jar having rubber balls. To this solution, about 50% of a powder mix containing 336 grams of Globe −70 mesh silicon powder, manufactured by Globe Metallurgical in Cleveland, Ohio, and 364 grams of Min-U-Sil 10 silica powder, manufactured by U.S. Silica, Berkeley Springs, W.Va., were added. This mixture of powders and liquids was then mixed by rolling at 100 rpm for about 30 minutes. Another 20% of the powder mix was then added to the jar, and the pH of the mixture was adjusted to about 8.5 with sodium hydroxide. The mixture was again mixed for 30 minutes. The remaining solids were added in 10% increments, with 30 minutes of mixing taking place between each added increment. When the entire solid mix was added to the jar, mixing was commenced for about 24 hours. After this extended mixing, the pH was checked and adjusted to about 8.5.

The slip produced above was then solid cast into a plaster mold having a tile shape.

Upon demolding, the green body was fired in a periodic vacuum nitriding furnace having an atmosphere containing about ½ an atmosphere of nitrogen. The firing cycle included an initial 8 hour soak at 1370° C. and a second soak at a temperature of about 1440° C. for about 6 hours. The product of this cycle was a reaction bonded silicon nitride. The RBSN material had a density of 2.25 g/cc. The coarse fraction constituted about 20 w/o of the RBSN and consisted essentially of beta silicon nitride and silicon. By x-ray diffraction it was determined the whole ceramic contained about 60% $Si_2ON_2$, 10% beta $Si_3N_4$, 15% cristobalite and 10% free silicon contained as cores in beta silicon nitride shells.

EXAMPLE II

This example was processed identically as in Example I, except that Globe −120 mesh was used as the silicon powder and Min-U-Sil 5 was used as the silica. The nitrided material had a density of 2.4 g/cc. The coarse fraction constituted between about 30 w/o and about 40 w/o of the RBSN and consisted essentially of beta silicon nitride and silicon. The whole ceramic contained about 35% beta $Si_3N_4$, 35% alpha $Si_3N_4$, 20% free silicon and 10% $Si_2ON_2$. The free silicon was present as cores of between 10 and 80 microns in diameter contained within 1 to 20 micron thick shells of beta $Si_3N_4$.

EXAMPLE III

This example was processed identically as in Example II, except that Elkem 0.5% MAX IRON <10 MICRON was substituted for the silica. The nitrided material as a whole contained about 40% beta silicon nitride, about 30% alpha silicon nitride and above 30% free silicon. The coarse fraction constituted between about 30 w/o and about 40 w/o of the RBSN and consisted essentially of beta silicon nitride and silicon. The free silicon was present as cores of between about 10 and about 80 microns contained within shells of beta silicon nitride having a thickness of between about 1 and about 20 microns.

EXAMPLE IV

This example was processed identically as in Example I, except that 4000 grams of Globe −74 mesh silicon powder, 1600 g of Elkem 0.5% MAX IRON <10 MICRON silicon powder, and 2400 grams of Min-U-Sil 10 were used as the RBSN precursor materials. Further, Colloid 111M, manufactured by Colloids,Inc. of Newark, N.J. was substituted as the dispersant; only half as much binder was used; and the green body was nitrided in a tunnel kiln having an atmosphere containing 1 atmosphere of nitrogen at a maximum temperature of about 1420° C. for a total cycle time of about 7 days, but with a slow ramp of between about 2° and 10° C. per hour between 1300° and 1400° C. The RBSN as a whole contained about 30% free silicon, about 30% silicon oxynitride, about 10% alpha silicon nitride, about 20% beta silicon nitride and about 10% beta silicon carbide. The coarse fraction constituted between about 30 w/o and about 40 w/o of the RBSN and consisted essentially of beta silicon nitride and silicon. Without wishing to be tied to a theory, it is believed the silicon carbide was produced by the reaction of surface silicon in the green body with carbon remnants within the tunnel kiln atmosphere. The flexural strength of this ceramic was examined through three-point bending tests and was found to be about 175 MPa.

When an RBSN ceramic contacts oxygen, some oxidation can be expected as the oxygen reacts with the silicon nitride to form silica. This reaction is deleterious to the mechanical properties of the ceramic and typically results in a weight gain. To evaluate the relative oxidation resistance of the ceramic of the present invention, the weight gain of the ceramics of the present invention and a conventional RBSN were measured. In particular, an RBSN tile for each of Example IV and a conventional fine-grained RBSN (NCX- 5301, available from the Saint-Gobain/Norton Industrial Ceramics Corporation of Worcester, Mass.) were placed in a oxidizing atmosphere-oven set at about 1150° C. for about 24 hours. Prior to being placed in the oven, each tile had dimensions of about 25×50×5 mm. After exposure, the conventional RBSN tile gained about 4.3 w/o while the RBSN tile of Example IV gained only about 2.2 w/o. Thus, the tile of the present invention was about twice as resistant to oxidation resistance as the conventional RBSN.

EXAMPLE V

This Example was processed identically to Example IV, except that it included a soak at a temperature of about 1380° C. for about 16 hours. This soak resulted in development of a beta silicon nitride shell to a degree that meltout was prevented upon proceeding to the final soak temperature of 1440° C. The resulting ceramic contained composite grains having unreacted silicon cores, wherein the silicon cores comprised about 30 v/o of the ceramic.

EXAMPLE VI

This Example was processed identically to Example IV, except that the fine grain fraction consisted of a highly pure silicon powder having an average particle size of less than about 1 micron (available from Ethyl Corp. of Baton Rogue, La.) and the coarse fraction had an average particle size of about 80 microns. Further, the fine fraction comprised about 52 w/o of the green body. The RBSN so produced was highly pure, with contamination from metallics being less than about 1 ppm of the ceramic. There was no meltout experienced even though the final soak temperature was about 1440° C.

EXAMPLE VII

This Example was processed identically to Example IV, except that the green body comprised about 50 w/o of a highly pure silicon powder having an average particle size of about 1000 microns (available from Ethyl Corp. of Baton Rogue, La.); about 30 w/o of a highly pure silicon powder having an average particle size of about 80 microns (available from Ethyl Corp. of Baton Rogue, La.); and about 20 w/o of a highly pure silicon powder having an average particle size of less than 1 micron (available from Ethyl Corp. of Baton Rogue, La.). No meltout was experienced during the nitridation of this body.

COMPARATIVE EXAMPLE I

This Comparative Example was processed identically to Example I, except that a periodic furnace cycle was used with a ramp rate of about 50° C. per hour starting at about 1300° C. and ending at about 1440° C. This cycle resulted in significant silicon meltout and a non-functional product.

I claim:

1. A reaction bonded silicon nitride ceramic comprising:
   a) between 20 w/o and 90 w/o unnecked composite grains comprising:
      i) between 5 w/o and 100 w/o silicon nitride, and
      ii) between 0 w/o and 95 w/o free silicon, said composite grains having lengths of at least 50 microns and widths of at least 10 microns, and
   b) between 10 w/o and 80 w/o matrix grains having lengths of less than 20 microns.

2. The reaction bonded silicon nitride ceramic of claim 1, wherein the composite grains comprise between about 30 w/o and 70 w/o of the ceramic.

3. The reaction bonded silicon nitride ceramic of claim 2 wherein the composite grains comprise:
   i) between 5 w/o and 99 w/o silicon nitride in the form of a dense beta silicon nitride shell, and
   ii) between 1 w/o and 95 w/o free silicon in the form of a free silicon core,
   said composite grains having lengths of at least 50 microns and widths of at least 10 microns.

4. The reaction bonded silicon nitride ceramic of claim 3 wherein the dense beta silicon nitride shell comprises between 20 w/o and 99 w/o of the composite grain.

5. The reaction bonded silicon nitride ceramic of claim 3 wherein the dense beta silicon nitride shell comprises between 60 w/o and 99 w/o of the composite grain.

6. The reaction bonded silicon nitride ceramic of claim 3 wherein the dense beta silicon nitride shell comprises between 80 w/o and 99 w/o of the composite grain.

7. The reaction bonded silicon nitride ceramic of claim 6 consisting essentially of between 30 w/o and 70 w/o composite grains and between 30 w/o and 70 w/o matrix grains.

8. The reaction bonded silicon nitride ceramic of claim 7, wherein the composite grains have widths of at least 20 microns.

9. The reaction bonded silicon nitride ceramic of claim 8, wherein the composite grains have lengths of between 75 and 125 microns.

10. The reaction bonded silicon nitride ceramic of claim 8, wherein the composite grains have lengths of at least 100 microns.

11. The reaction bonded silicon nitride ceramic of claim 8, wherein the composite grains have an average aspect ratio of between 1:1 and 3:1.

12. The reaction bonded silicon nitride ceramic of claim 8, wherein the composite grains have an average aspect ratio of between 1:1 and 2:1.

13. The reaction bonded silicon nitride ceramic of claim 8 wherein the matrix grains comprise silicon nitride.

14. The reaction bonded silicon nitride ceramic of claim 8 wherein the matrix grains comprise:
   a) between 0 w/o and 30 w/o silicon nitride, and
   b) between 30 w/o and 65 w/o silicon oxynitride.

15. The reaction bonded silicon nitride ceramic of claim 8 wherein the matrix grains comprise:
   a) between 10 w/o and 30 w/o silicon nitride, and
   b) between 40 w/o and 60 w/o silicon oxynitride.

16. The reaction bonded silicon nitride ceramic of claim 8 wherein the matrix grains comprise:
   a) between 10 w/o and 20 w/o silicon nitride, and
   b) between 40 w/o and 50 w/o silicon oxynitride.

17. The reaction bonded silicon nitride ceramic of claim 8 Wherein the matrix grains have lengths of between 1 and 20 microns.

18. The reaction bonded silicon nitride ceramic of claim 8 wherein the matrix grains have lengths of between 3 and 20 microns.

19. The reaction bonded silicon nitride ceramic of claim 8 having a thickness of at least ½ of an inch.

20. The reaction bonded silicon nitride ceramic of claim 8 having iron present in an amount of less than 100 ppm.

21. The reaction bonded silicon nitride ceramic of claim 8 having a thickness of at least ¾ of an inch.

* * * * *